United States Patent [19]

Mesly

[11] 3,860,257

[45] Jan. 14, 1975

[54] SELF-TRACKING BOGIE ASSEMBLY FOR A TRACTOR OR TRAILER VEHICLE

[76] Inventor: Xavier Mesly, 775 Vimy, Quebec, Canada

[22] Filed: May 29, 1974

[21] Appl. No.: 474,203

[52] U.S. Cl. ............................................. 280/81 A
[51] Int. Cl. .......................................... B62d 53/06
[58] Field of Search ................ 280/81 A, 81 R, 426

[56] References Cited
UNITED STATES PATENTS

| | | | |
|---|---|---|---|
| 2,705,201 | 6/1956 | Hagedorn | 280/81 A X |
| 3,057,639 | 10/1962 | Georgi | 280/81 A |
| 3,318,613 | 5/1967 | House | 280/81 A |
| 3,381,974 | 5/1968 | Carter et al. | 280/81 A X |
| 3,700,255 | 10/1972 | Herbert | 280/81 A |

FOREIGN PATENTS OR APPLICATIONS

| | | | |
|---|---|---|---|
| 1,543,207 | 10/1968 | France | 280/81 A |

*Primary Examiner*—Leo Friaglia
*Attorney, Agent, or Firm*—Cushman, Darby & Cushman

[57] ABSTRACT

The disclosure herein describes a self-tracking bogie assembly for a tractor or trailer vehicle which includes truck means disposed beneath a rear portion of the tractor or trailer frame and provided with supporting frame means to which is attached a transverse axle with a plurality of road wheels. The assembly further includes first pivot means extending vertically through the supporting frame means, the vertical axis of the pivot means extending, in the longitudinal axis of the trailer frame, frontwardly of the horizontal axis of the transverse axle; second pivot means are mounted to the trailer frame frontwardly of the first pivot means; coupling means are connected at one end to the second pivot means and at the other end to the first pivot means for drawing the truck means; and tie means cooperate with the coupling means to allow a first angular displacement of the truck means about the second pivot means and a second angular displacement of the truck means about the first pivot means.

14 Claims, 6 Drawing Figures

PATENTED JAN 14 1975　　3,860,257
SHEET 1 OF 2
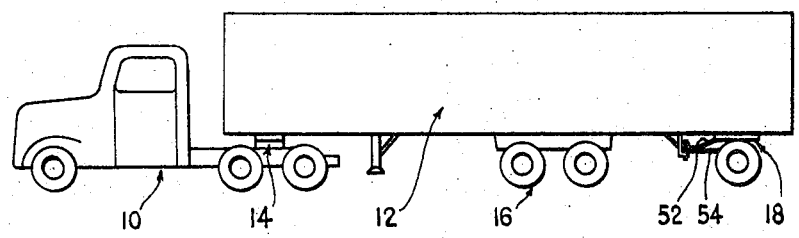
FIG.1
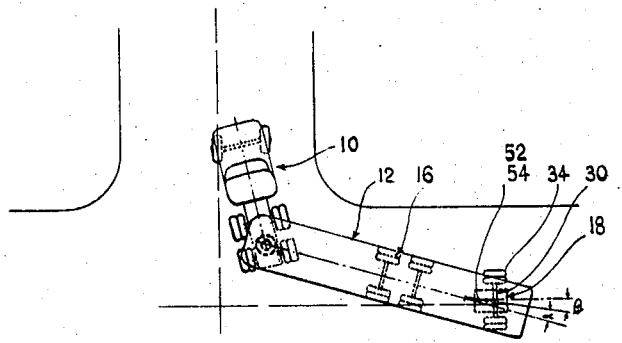
FIG.2
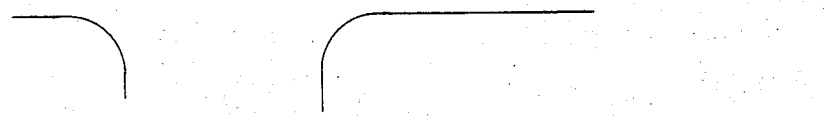
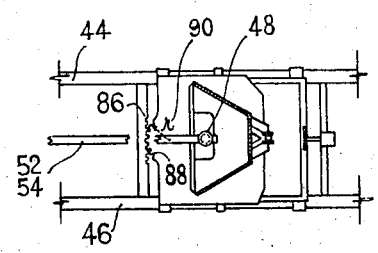
FIG.6　　　　　　　　　　FIG.5

SELF-TRACKING BOGIE ASSEMBLY FOR A TRACTOR OR TRAILER VEHICLE

FIELD OF THE INVENTION

The present invention relates to a self-tracking bogie assembly for a tractor, trailer or semi-trailer vehicle.

BACKGROUND OF THE INVENTION

Prior constructions in this field include means for steering or controlling the movement of certain wheels of a trailer either through hydraulic or mechanical steering mechanisms which are operated directly from the steering mechanism of the tractor vehicle to which the trailer is attached.

Other constructions include self-tracking systems which operate independently of the tractor vehicle or of any other wheel assembly of the trailer vehicle. Some of these consist of a turn table arrangement operatively connected to a king pin extending vertically over the horizontal axis of the wheel axle or through the central axis of a tandem.

Others consist of steered wheels where the axle is fixed and only the wheels are orientable through separate pivot points.

It has been noted that such constructions have numerous inherent disadvantages. In most cases, the angular displacement of the self-tracking units are limited to a few degrees with respect to the central axis of the trailer frame to thereby limit the cantilever effect of the load carry frame over the unit when effecting a turn. In other cases, this angular displacement is very limited due to the structure of the trailer frame. Also, it has been observed that it is extremely difficult to stabilize these assemblies against vibrations obtained at relatively high speed. Most systems provided to avoid such vibration are not directly coordinated with the load on the trailer or tractor.

STATEMENT OF THE INVENTION

It is an object of this invention to provide a bogie assembly for a tractor, trailer or semi-trailer vehicle which tracks rather than cuts sharp bends thereby reducing tire slippage and suspension wear.

It is a further object of this invention to provide a bogie assembly which allows the wheel supporting frame to swing farther out without creating a cantilever effect on the load carrying trailer frame.

It is still a further object of this invention to provide a bogie assembly which avoids considerable deterioration to road surfaces by providing greater angular displacement of the assembly.

The present invention is therefore concerned principally with allowing an increased angular displacement of the bogie assembly with respect to the longitudinal axis of the tractor or trailer vehicle when effecting a turn. This is achieved by the combination of two angular displacements of the bogie assembly about two separate pivot points.

The present invention therefore relates to a self-tracking bogie assembly for a tractor or trailer vehicle which comprises: truck means disposed beneath a portion of the frame of the trailer vehicle, the truck means including supporting frame means, to which is attached the transverse wheel axle; first pivot means extending vertically through the supporting frame means; second pivot means mounted to the frame of the vehicle frontwardly of the first pivot means; coupling means connected, at one end, to the second pivot means and, at the other end, to the first pivot means for drawing the truck means; and tie means, having one end attached to the frame of the vehicle and the other end attached to the truck means; the coupling means and the tie means together cooperating to allow the combination of two angular displacements of the truck means with respect to the tractor or trailer frame.

In one preferred form of the invention, the bogie assembly operates with four pivot points, one at each end of a connecting rod and of a tie rod, acting respectively as the coupling means and the tie means.

Other alternatives are also described as possible where the tie means may consist of a system of cable, chain, or of a toothed rack arrangement.

BRIEF DESCRIPTION OF THE DRAWINGS

Other objects and characteristic features of the present invention will be in part obvious from the accompanying drawings, and in part pointed out as the description of the invention progresses. In describing the invention in detail, reference will be made to the accompanying drawings in which like reference characters will refer to like or corresponding parts and in which:

FIG. 1 is a schematic side view of a tractor and semi-trailer vehicle showing a location for a bogie assembly made in accordance with the present invention;

FIG. 2 is a schematic top view of the tractor and semi-trailer vehicle effecting a curve, showing the bogie assembly of the present invention in operation;

FIGS. 5 and 6 illustrate two other embodiments of the bogie assembly of the present invention, the figures being shown on the sheet illustrating FIGS. 1 and 2.

GENERAL DESCRIPTION

Figure 3:
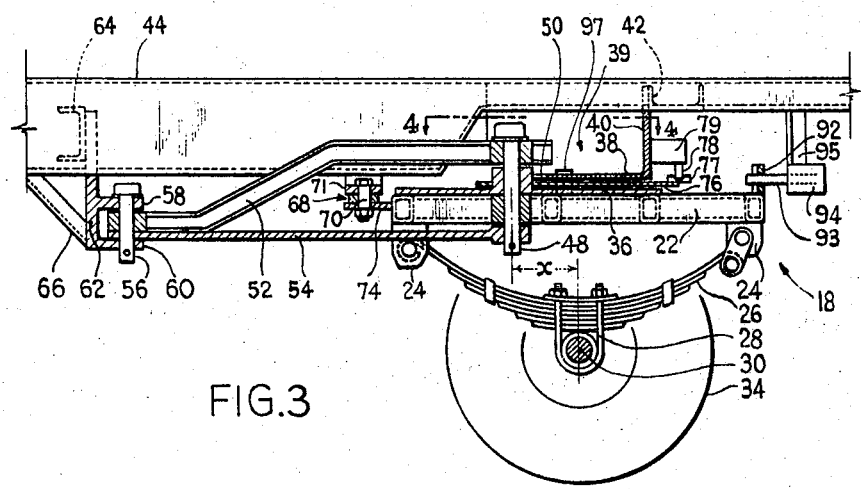
FIG. 3 is a side elevational view of the bogie assembly.

Referring now to FIG. 1, there is shown a tractor 10 and a semi-trailer 12 pivotally connected to the tractor in a conventional manner, such as by a fifth wheel 14. The semi-trailer 12 includes tandem wheels 16 disposed intermediately of the trailer frame and a bogie assembly 18 disposed beneath the rear portion of the vehicle. However, there are many types of trailers and the present invention is not limited to a bogie assembly disposed solely beneath the rear portion of a trailer frame; such bogie assembly 18 may also be positioned intermediately of the trailer vehicle with the tandem disposed beneath the rear portion. The bogie assembly 18 may further be mounted to a self-loading or telescopically attached rear portion of a trailer. Also, two of these bogie assemblies could be mounted to a long trailer vehicle with the tandem disposed therebetween.

Furthermore, the bogie assembly could be mounted to a long tractor.

DESCRIPTION OF ONE EMBODIMENT

Figure 4:
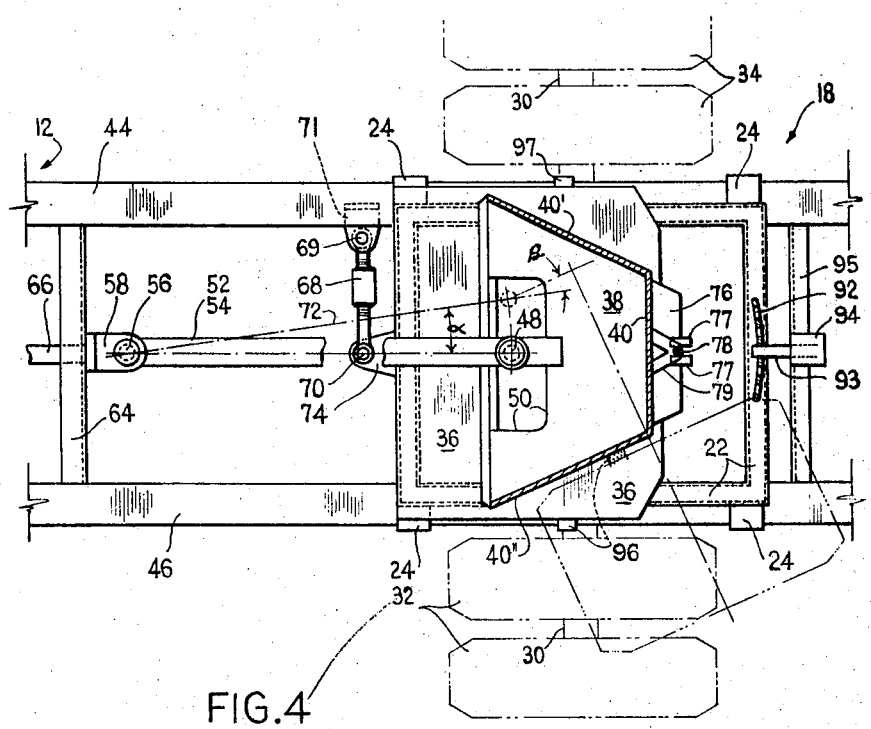
FIG. 4 is a top sectional view taken along lines 4—4 of FIG. 3.

Referring to FIGS. 3 and 4, the bogie assembly 18 illustrated includes truck means that include a rectangular-shaped rigid supporting frame 22 provided with a series of brackets 24 at its sides for connecting a pair of spring leaf assemblies 26 (one of which is shown in FIG. 3). U-bolts 28 secure the leaf spring assemblies to the transverse axle 30, at the opposite ends of which are journaled a pair of wheels 32 and 34. Secured to the top of frame 22, a load bearing plate 36 has a high friction face over which extends a load transfer plate 38 also provided with a high friction face. Plate 38 forms the base of a vertical support housing 39 with three sidewalls 40, 40' and 40''. The sidewalls have their upper ends secured to the trailer frame, such as channel 42 for sidewall 40 which has its opposite ends fixedly attached to the two longitudinal side frame members 44 and 46 of the trailer vehicle.

A first pivot means, such as bolt 48, extends through the supporting frame 22, plate 36 and plate 38. A large opening 50 is provided in base plate 38 to allow the swinging movement of the bolt 48, as hereinbelow described. An important feature of the present invention is that the vertical axis extending through bolt 48 is offset frontwardly with respect to the horizontal axis of the wheel axle 30; this distance is indicated by the letter X in FIG. 3.

The upper and lower extremities of bolt 48 receive one end of a coupling arrangement that includes, in this embodiment, a pair of connecting rods 52 and 54. The other ends of these rods meet and are pivotally connected to a second pivot means that includes a pin 56 supported by means of bracket arms 58 and 60 to a vertical support 62, the upper end of which is fixedly attached to a transverse frame channel 64 of the trailer vehicle. Another support member 66 provides reinforcement for vertical support 62.

Referring more particularly to FIG. 4, tie means are provided to attach the truck means to the trailer frame and consist of an adjustable tie rod 68 having one end 69 pivotally mounted to a bracket 71 attached to the longitudinal side frame 44 of the trailer and the other end 70 pivotally mounted to a projection 74 of the plate 36 of the truck means.

When the assembled tractor and trailer effect a turn (as illustrated in FIG. 2), the trailer frame is pulled sidewise while travelling forward causing friction wear on the tires as well as on the road surface. The bogie assembly 18 of the present invention considerably reduces this wear by allowing the wheels to follow the normal line of displacement of the trailer frame. This is obtained by the combination of two angular displacements of the truck means with respect to the longitudinal direction of the trailer vehicle. The first angular displacement, represented in FIGS. 2 and 4 by $\alpha$, is the result of the pivotal movement of the connecting rods 52-54 to the position 72 shown in dotted line. The second angular displacement, represented in FIGS. 2 and 4 by $\beta$, is the result of the pivotal movement of the truck means 22-36 about bolt 48, which is free to move angularly in opening 50 of the base plate 38 of the frame 40. Pivotal connections at 48, 56, 69 and 70 allow these angular displacements of the connecting and tie rods and of the truck means. To limit the angular displacements, abutments 96-97 mounted to the frame 22 come into contact with the sidewalls 40' and 40'' of the vertical support housing 39 (see dotted line representation in FIG. 4).

Adequate stability of the present assembly is proportional to the load carried by the trailer. However, to increase the friction coefficient, there may be provided between plates 36 and 38 one or more friction plates 76, the opposite faces of which are in sliding contact with the friction faces of plates 36 and 38. To maintain the friction plate 76 between plates 36 and 38 and to oppose the movement of plate 36 relative to the fixed housing 39, a cylindrical rod 78 is fixedly mounted to the rear sidewall 40 by means of a bracket 79 and has its lower end constricted between two arms 77 fixed to the plate 76.

To ensure that the trailer will remain in a given direction when travelling backwards, there is provided a locking arrangement which may consist of a curved plate 92 provided on frame 22 with a series of aligned holes on its face to receive the locking pin 93 of a locking housing 94 mounted to a transverse channel 95 of the trailer frame. It is evident that there are many other ways of locking the truck means to the trailer frame.

DESCRIPTION OF OTHER EMBODIMENTS

FIGS. 5 and 6 illustrate two alternatives for the tie means which connect the trailer frame to the truck means.

FIG. 5 illustrates the use of cables 80, 80' having one end 82, 82' suitably attached to the trailer frame 44, 46 respectively and the other end 84, 84' suitably attached to the truck means. Similarly, chains may be used instead of cables and, in both cases, the pair of cables or chains could be replaced by a single cable or chain which would circumferentially engage a circular portion on the truck means (extremities 84 and 84' would then be non-existent).

FIG. 6 illustrates schematically a toothed rack arrangement where a toothed member 86 is secured at opposite ends to the side frames 44 and 46 of the trailer frame and a toothed portion 88 thereof is in engagement with a toothed segment 90 provided on the truck means. In such case, however, the radius of curvature $r$ of the arc-shaped segment 90 should be smaller than the distance separating the toothed portion 88 and the bolt 48.

Although the invention has been described above in relation to a certain number of forms, it is evident that it may be refined and modified in various ways. For example, hydraulic connections may be used with the tie means illustrated in FIG. 3 to provide shock adsorbing action during the displacement of the truck means; also, such hydraulic means could be arranged to lock the truck means with respect to the trailer frame to allow the backward travel of the trailer. Furthermore, air suspension means may be installed on the truck means for the leaf spring suspension. Also, the tie means may be mounted to the truck means rearwardly of the horizontal axis of the wheel axle to provide similar angular displacements. It is therefore wished to have it understood that the present invention is not limited in interpretation except by the terms of the following claims.

What I claim is:

1. A self-tracking bogie assembly for a tractor or trailer vehicle having an elongate frame, comprising in combination:
    a. truck means disposed beneath a portion of said elongate frame; said truck means including:
        1. supporting frame means;
        2. a transverse axle attached to said supporting frame means; and
        3. a plurality of road wheels journaled to said transverse axle;
    b. first pivot means extending vertically through said supporting frame means, the vertical axis of said first pivot means being offset with respect to an horizontal axis extending through said transverse axle;

c. second pivot means mounted to said elongate frame frontwardly of said first pivot means in the longitudinal axis of said elongate frame;

d. coupling means connected, at one end thereof, to said second pivot means and, at the other end thereof, to said first pivot means for drawing said truck means; and e. tie means having one end attached to said elongate frame and the other end attached to said supporting frame means; said coupling means and said tie means connecting said truck means to said elongate frame and together cooperating to allow an angular displacement of said truck means about said second pivot means and a further angular displacement of said truck means about said first pivot means.

2. A self-tracking bogie assembly for a tractor or trailer vehicle having an elongate frame, comprising in combination:

a. truck means disposed beneath a rear portion of said frame; said truck means including:
 1. supporting frame means;
 2. a transverse axle attached to said supporting frame means; and
 3. a plurality of road wheels journaled to said transverse axle;

b. first pivot means extending vertically through said supporting frame means, the vertical axis of said first pivot means being offset in the longitudinal axis of said elongate frame, frontwardly of an horizontal axis extending through said transverse axle;

c. second pivot means mounted to said elongate frame centrally thereof and frontwardly of said first pivot means, said first and second pivot means being aligned in the longitudinal symmetrical axis of said elongate frame when said vehicle travels in a straight line;

d. coupling means connected, at one end, thereof to said second pivot means and, at the other end thereof, to said first pivot means for drawing said truck means; and e. tie means having one end attached to said elongate frame and the other end attached to said supporting frame means; said coupling means and said tie means connecting said truck means to said elongate frame and together cooperating to allow an angular displacement of said truck means about said second pivot means and a further angular displacement of said truck means about said first pivot means.

3. A bogie assembly as defined in claim 2, wherein said coupling means include: a first rod having a front end pivotally attached to said second pivot means and a rear end received at the lower portion of said first pivot means, and a second rod having a front end pivotally attached to said second pivot means and a rear end pivotally attached to the upper portion of said first pivot means above said supporting frame means.

4. A bogie assembly as defined in claim 3, wherein said second pivot means include: bracket means disposed beneath said elongate frame and fixedly attached thereto, and a pin mounted to said bracket means for receiving said front ends of said first and second rods of said coupling means.

5. A bogie assembly as defined in claim 2, wherein said tie means include a tie rod having one end pivotally mounted to said elongate frame and the other end pivotally mounted to said supporting frame means, frontwardly of said first pivot means.

6. A bogie assembly as defined in claim 5, wherein said tie rod is adjustable for various distances separating said elongate frame from said supporting frame means.

7. A bogie assembly as defined in claim 5, wherein said tie rod extends perpendicularly to the longitudinal axis of said elongate frame when said vehicle travels in a straight line.

8. A bogie assembly as defined in claim 2, wherein said coupling means include first and second rods, each having a front end pivotally connected to said second pivot means and a rear end respectively mounted at the upper and lower portions of said first pivot means; said supporting frame means including a rigid frame and a load bearing plate mounted over said rigid frame; a load transfer plate disposed over said load bearing plate and fixedly attached to said elongate frame; said first pivot means extending through said plates and said rear end of said second rod extending over said load transfer plate.

9. A bogie assembly as defined in claim 8, further comprising abutment means on opposite sides of said rigid frame for contacting said load transfer plate to thereby limit the angular displacement of said truck means about said first and second pivot means.

10. A bogie assembly as defined in claim 8, further comprising: friction plate means disposed between said load bearing plate and said load transfer plate for damping the movement between said load bearing plate and said load transfer plate.

11. A bogie assembly as defined in claim 2, further comprising means for locking said truck means to said elongate frame for allowing said trailer vehicle to travel in a backward direction.

12. A bogie assembly as defined in claim 2, wherein said tie means include chain means having one end attached to said elongate frame and the opposite end attached to said supporting frame means.

13. A bogie assembly as defined in claim 2, wherein said tie means include cable means having one end attached to said trailer frame and the opposite end attached to said supporting frame means.

14. A bogie assembly as defined in claim 2, wherein said tie means include a toothed rack mounted transversely to said trailer frame; said supporting frame means including a toothed portion in engagement with said toothed rack.

* * * * *